(12) United States Patent
Spry et al.

(10) Patent No.: US 7,343,621 B2
(45) Date of Patent: Mar. 11, 2008

(54) METHOD AND APPARATUS FOR PROVIDING ISCSI TARGET STEALTH OPERATION

(75) Inventors: Andrew J Spry, Wichita, KS (US); William Deitz, Niwot, CO (US)

(73) Assignee: LSI Logic Corporation, Milpitas, CA (US)

( * ) Notice: Subject to any disclaimer, the term of this patent is extended or adjusted under 35 U.S.C. 154(b) by 695 days.

(21) Appl. No.: 10/729,115

(22) Filed: Dec. 5, 2003

(65) Prior Publication Data

US 2005/0125654 A1    Jun. 9, 2005

(51) Int. Cl.
H04L 9/00 (2006.01)
H04L 9/14 (2006.01)
H04L 9/36 (2006.01)

(52) U.S. Cl. .................... 726/2; 726/3; 726/4; 726/16; 726/17

(58) Field of Classification Search ..................... 726/2
See application file for complete search history.

(56) References Cited

U.S. PATENT DOCUMENTS 6,052,784 A * 4/2000 Day ........................... 726/22
7,134,139 B2 * 11/2006 Hetzler et al. ................. 726/2

OTHER PUBLICATIONS

Krueger, Haagens, Sapuntzakis, Bakke, Small Computer Systems Interface protocol over the Internet (iSCSI), Jul. 2002, RFC 3347. http://www.ietf.org/rfc/rfc3347.txt.*

* cited by examiner

Primary Examiner—Nasser Moazzami
Assistant Examiner—Oscar A Louie
(74) Attorney, Agent, or Firm—Suiter Swantz PC LLO

(57) ABSTRACT

The present invention is a method and apparatus for providing iSCSI target stealth operation. In an exemplary aspect of the present invention, a method for prohibiting iSCSI discovery sessions may include the following steps: (a) receiving an iSCSI login request; (b) determining whether the iSCSI login request payload contains a "SessionType=Discovery" key/value pair; and (c) when discovery sessions are disabled and the iSCSI login request contains the "SessionType=Discovery" key/value pair, rejecting the iSCSI login request with a iSCSI status-class of "Target Error" and status-detail of "Session Type not Supported." The present stealth mode may include the foregoing-described method for restricting the discovery operation and a method for managing discovery and ancillary protocols which may lead to denial of service attacks.

24 Claims, 2 Drawing Sheets

METHOD AND APPARATUS FOR PROVIDING ISCSI TARGET STEALTH OPERATION

FIELD OF THE INVENTION

This invention relates generally to data storage systems, and particularly to a method and apparatus for providing iSCSI target stealth operation.

BACKGROUND OF THE INVENTION

Internet Small Computer System Interface (iSCSI) is an SCSI transport protocol for mapping of block-orientated storage data over TCP/IP (Transmission Control Protocol/Internet Protocol) networks. iSCSI builds on two widely used technologies—SCSI commands for storage and IP protocols for networking. By carrying SCSI commands over IP networks, iSCSI is used to facilitate data transfers over intranets and to manage storage over long distances. The iSCSI protocol enables universal access to storage devices and storage area networks (SANs). These networks may be dedicated networks or may be shared with traditional Ethernet applications.

The iSCSI standard defines a light weight discovery mechanism using the SendTargets text command and discovery sessions. When the SendTargets text command is used with the "All" option in a discovery session opened on the iSCSI network entity, the iSCSI network entity is required to return a list of all targets on the network entity and all of the portal groups associated with each target. In an open IP network, this information may provide potential attackers with significant information about what may be stored on the iSCSI network entity. Additionally, even if no information is exposed by target names, the reported portal information may be used by potential attackers to mount denial of services attacks to the IP addresses on the network entity.

The iSCSI protocol may also use other ancillary protocols to support its operation. Some of these protocols such as ICMP (Internet Control Message Protocol), SLP (Service Location Protocol), iSNS (Internet Storage Name Service), and SNMP (Simple Network Management Protocol) are not required for all installations or may only be required during system configuration. However, if the unneeded protocols are left in an enabled state, they may be used by potential attackers to mount denial of services attacks on the network entity.

Thus, it would be desirable to provide a method and apparatus for providing iSCSI target stealth operation without compromising standard iSCSI target function. Such a method and apparatus may allow an iSCSI storage device to be secured for discovery and to avoid denial of services attacks on certain supporting network services.

SUMMARY OF THE INVENTION

Accordingly, the present invention is directed to a method and apparatus for providing iSCSI target stealth operation. In an exemplary aspect of the present invention, a method for prohibiting iSCSI discovery sessions may include the following steps: (a) receiving an iSCSI login request; (b) determining whether the iSCSI login request payload contains a "SessionType=Discovery" key/value pair; and (c) when discovery sessions are disabled and the iSCSI login request contains the "SessionType=Discovery" key/value pair, rejecting the iSCSI login request with a iSCSI status-class of "Target Error" and status-detail of "Session Type not Supported." In a preferred embodiment, the session type is declared on the initial login request. If the session type is not explicitly declared, the target may assume that the session is not a discovery session and an explicit target need be specified.

In an additional exemplary aspect of the present invention, a method for providing iSCSI target stealth operation may include the following steps: (a) providing a setting to individually enable/disable at least one of discovery sessions, SLP, iSNS, ICMP, and SNMP; and (b) when the discovery session, the SLP, and the iSNS are all disabled, providing a warning that an initiator must be statically configured to locate a target on an iSCSI entity.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
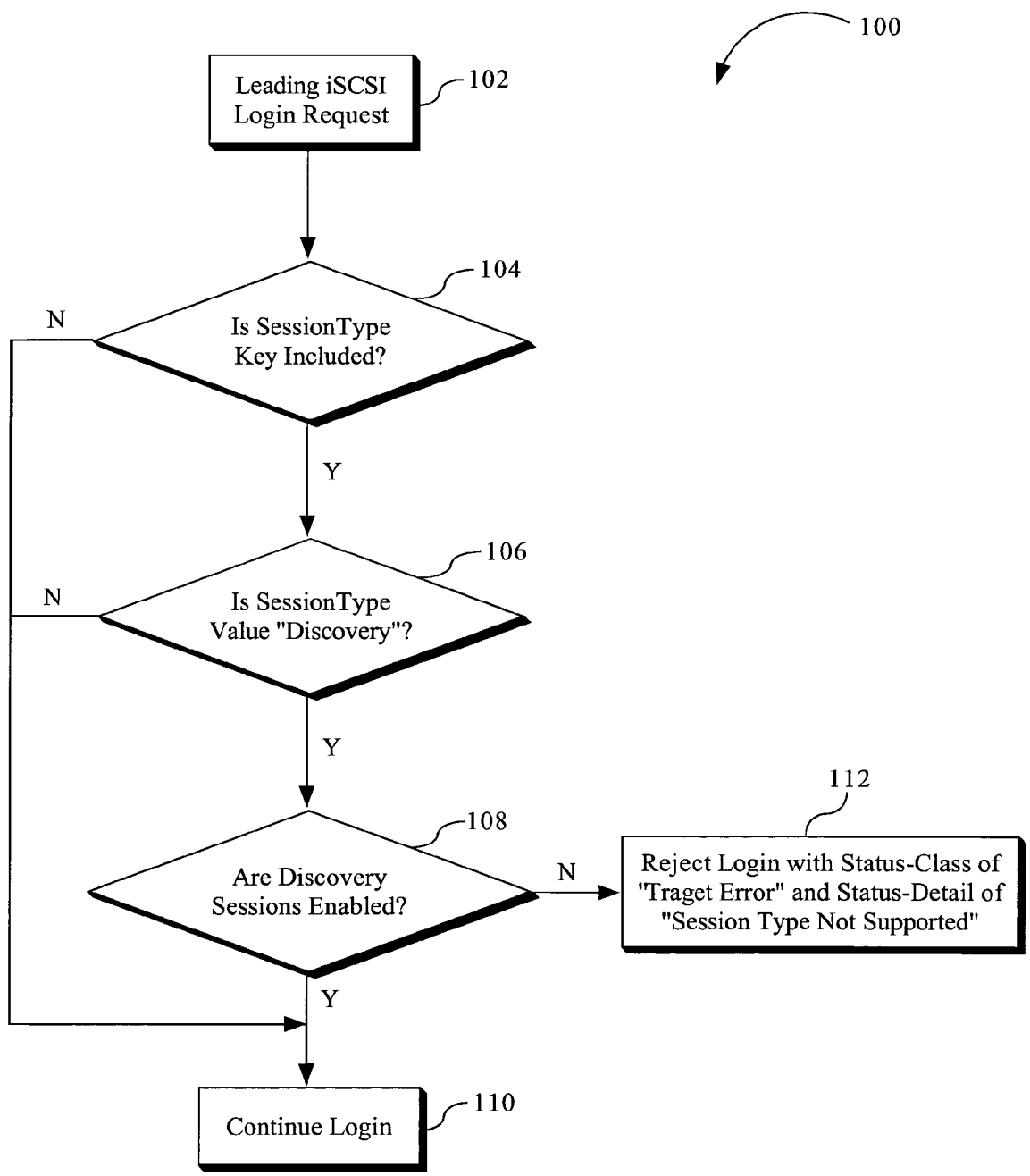
FIG. 1 is a flow chart illustrating an exemplary method for prohibiting iSCSI discovery sessions in accordance with the present invention.

Reference will now be made in detail to the presently preferred embodiments of the invention, examples of which are illustrated in the accompanying drawings.

The present invention provides a method and apparatus by which an iSCSI storage device may be operated in a stealth mode without compromising standard iSCSI target function. The present invention may allow an iSCSI storage device to be secured for discovery and to avoid denial of services attacks on certain supporting network services.

The iSCSI protocol includes a light weight discovery mechanism using a special discovery session type and the SendTargets text command, which may be referred to as SendTargets discovery. The iSCSI specifies that all portal groups must support SendTargets discovery on all portals of a network entity. The SendTargets discovery mechanism may be used by any device that understands a minimal subset of the iSCSI protocol to determine the names of all iSCSI targets and all iSCSI portals on a network device. This information may be useful to an attacker since the portal information alone may be sufficient to mount a denial of service attack on the iSCSI device.

The iSCSI standard specifies that discovery may be performed by two other supporting protocols external to the iSCSI protocol: SLP (Service Location Protocol), and iSNS (Internet Storage Name Service). Both SLP and iSNS may be configured to only provide information about iSCSI targets to known iSCSI initiators. This may prevent the information from being obtained by a malicious system using the iSCSI SendTargets discovery mechanism. When either the SLP or iSNS discovery mechanism is in use, the iSCSI network entity may be protected from malicious use of the SendTargets command by prohibiting the establishment of discovery sessions.

In addition to the foregoing mentioned discovery mechanisms, there are two ancillary network protocols which may be used by an attacker to mount a denial of service attack: ICMP (Internet Control Message Protocol) and SNMP (Simple Network Management Protocol). ICMP is a protocol used to report errors in the processing of datagrams. However, ICMP may contain a message type of "Echo Request" (Ping), which is typically used by an attacker to mount a denial of service attack. Therefore, having the ability to disable the servicing of ICMP "Echo Requests" becomes an integral part of Stealth mode operation in accordance with an exemplary embodiment of the present invention.

SNMP is a simple request-reply protocol between an SNMP manager and an SNMP agent used to obtain and/or control specific information about the management entity. In accordance with an exemplary embodiment of the present invention, access to this information needs to be disabled or restricted when operating in Stealth mode. The information about the management entity may include the following:

SNMP Enable—This controls the availability SNMP services. The default value is OFF.

Community String—Only SNMP management requests matching the community string will be responded to. Other requests will be silently dropped. The default value is "PUBLIC".

SNMP UDP Port—By default, the SNMP agent will listen on UDP port 161, but this may be modified for stealth purposes to another value selected by the system administrator. The selected value should not conflict with the well known Internet Assigned Numbers Authority (IANA) UDP port assignments.

SNMP UDP Trap Port—By default, the SNMP agent will generate Trap operators to the SNMP manager on UDP port 162, but this may be modified to another value selected by the system administrator. The selected value should not conflict with the well known Internet Assigned Numbers Authority (IANA) UDP port assignments.

Since the iSCSI standard requires support for discovery sessions on all network portals, prohibiting discovery sessions violates the iSCSI standard. However, providing discovery sessions as the default behavior while allowing discovery sessions to be prohibited as a system administrator option allows the additional protection while remaining iSCSI standard compliant.

A session type may be established by the initiator when the session is opened by the SessionType key in the login request payload. If the value of the SessionType is "Discovery" then the session is a discovery session. If the value of the SessionType is "Normal" or if the SessionType key is omitted, then the session type is a normal session. In a discovery session, only the SendTargets request and the logout command may be allowed to be sent by the initiator. A discovery session may not be permitted to have access to the storage resources of the target. However, a discovery session may consume a session and other management resources, which may reduce the number of normal sessions that can be opened if the discovery session is left open or repeatedly opened by a malicious system.

FIG. 1 is a flow chart illustrating an exemplary method or process 100 for prohibiting iSCSI discovery sessions in accordance with the present invention. According to the process 100, the initial iSCSI login request must contain the "SessionType=Discovery" key/value pair in its payload in order to open a discovery session. If the discovery session is requested and discovery sessions are disabled, the target may reject the session with the iSCSI status-class of "Target Error" and status-detail of "Session Type not Supported." Specifically, the process 100 may start with receiving a leading or initial iSCSI login request 102. An inquiry of whether a SessionType key is included may be performed 104. If the answer is no, the process 100 may proceed to a step 110 in which login is continued; if the answer is yes, an inquiry of whether a SessionType value is "Discovery" (i.e., whether a discovery session is being requested by the initiator) may be performed 106. If the answer is no, the process may proceed to the step 110; if the answer is yes, an inquiry of whether discovery sessions are enabled may be performed 108. If the answer is yes, the process 100 may proceed to the step 110; if the answer is no, login is rejected, preferably with the iSCSI status-class of "Target Error" and status-detail of "Session Type not Supported" 112, since the initiator is attempting to open a discovery session on a system where discovery sessions have been disabled. In a preferred embodiment, the session type is declared on the initial login request. If the session type is not explicitly declared, the target may assume that the session is not a discovery session and an explicit target need be specified.

Figure 2:
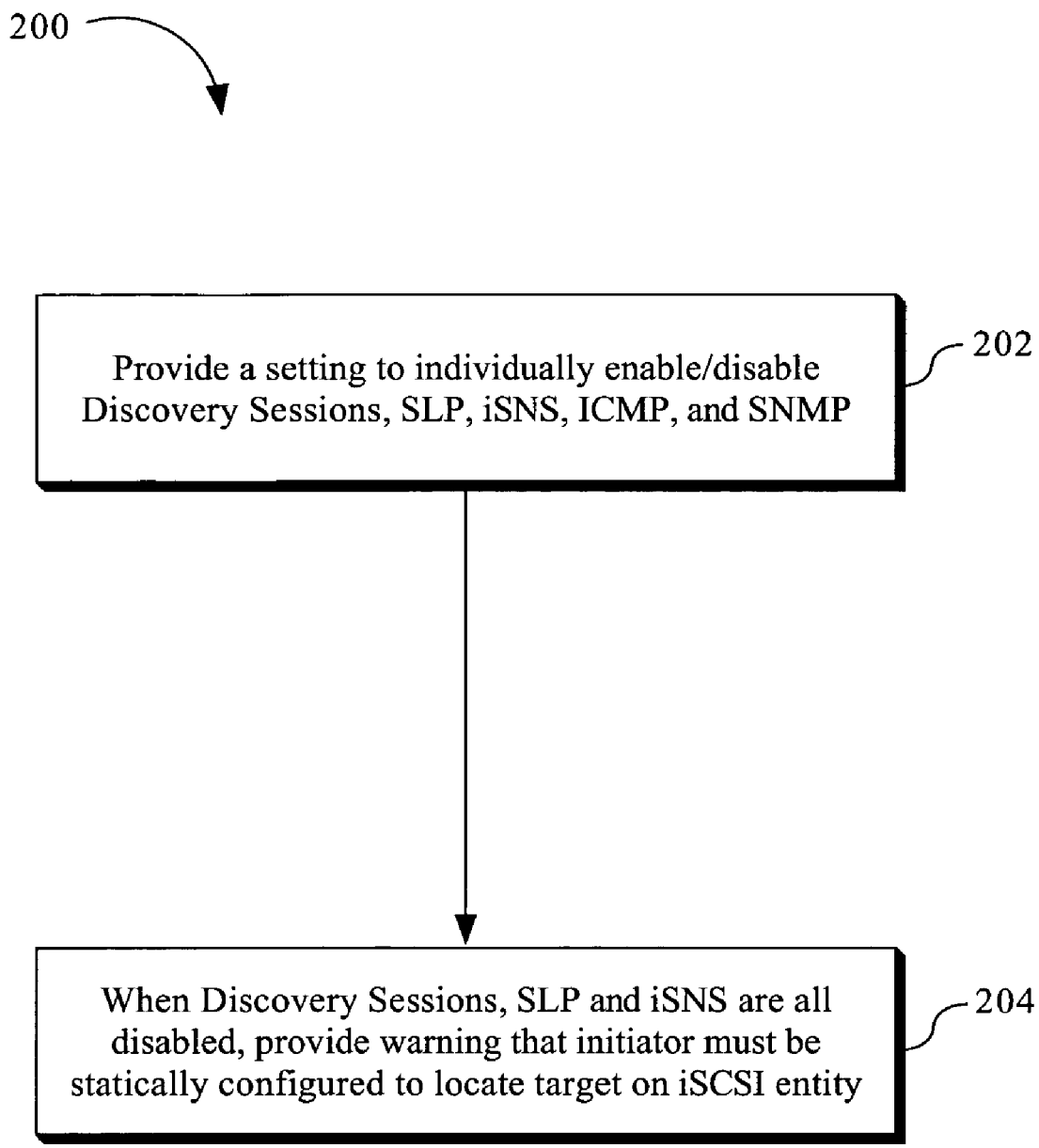
FIG. 2 is a flow chart illustrating an exemplary method for providing iSCSI target stealth operation in accordance with the present invention.

FIG. 2 is a flow chart illustrating an exemplary method or process 200 for providing iSCSI target stealth operation in accordance with the present invention. The management application may provide options to enable stealth mode. The process 200 may start with providing a setting to individually enable/disable at least one of discovery sessions, SLP, iSNS, ICMP and SNMP 202. Preferably, the stealth mode management screen may contain a setting to individually enable and disable at least one of the following protocols:

Discovery Sessions—Prohibit the use of unrestricted SendTargets commands;

Service Location Protocol—Prohibit the use of SLP discovery;

Internet Storage Name Services—Prohibit the use of iSNS discovery;

Internet Control Message Protocol—Prohibit the use of ICMP Echo Requests (Ping); and Simple Network Management Protocol—Prohibit the servicing of SNMP requests or change the default community string or the default UDP ports.

Next in step 204, when discovery sessions, SLP, and iSNS are all disabled, a warning is provided to the administrator that initiators must be statically configured to locate the targets on the iSCSI entity. It is understood that the enable/disable of the protocols covered by stealth mode may be distributed throughout a management application. The same warning to the user when all discovery mechanisms have been disabled may be provided, even when the configuration is distributed.

According to the present invention, the stealth mode may include the foregoing-described methods for restricting the discovery operation and for managing discovery and ancillary protocols which may lead to denial of service attacks.

The present invention may have the following advantages. First, discovery may be restricted to known initiators by using protocols that check initiator identity. Moreover, denial of services attacks may not be mounted on unused ancillary protocols.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for managing discovery and ancillary protocols which lead to denial of service attacks, comprising:
    maintaining iSCSI standard support for all discovery sessions on all network portals, including returning a list of all targets on the network entity and all of the portal groups associated with each target;
    providing send target discovery sessions as default behavior;
    prohibiting send target discovery sessions as a system administrator option;
    configuring discovery via supporting protocols external to the iSCSI protocol;
    receiving an iSCSI login request;
    determining whether a payload of said iSCSI login request contains a "SessionType=Discovery" key/value pair; and
    when discovery sessions are disabled and said iSCSI login request contains said "SessionType=Discovery" key/value pair, rejecting said iSCSI login request.

2. The method of claim 1, wherein said iSCSI login request is rejected with a iSCSI status-class of "Target Error" and status-detail of "Session Type not Supported."

3. The method of claim 1, further comprising:
    declaring a session type on said iSCSI login request.

4. The method of claim 1, further comprising:
    when a session type is not explicitly declared on said iSCSI login request, assuming a session type is not a discovery session and specifying a specific target.

5. An apparatus for managing discovery and ancillary protocols which lead to denial of service attacks, comprising:
    maintaining iSCSI standard support for all discovery sessions on all network portals, including returning a list of all targets on the network entity and all of the portal groups associated with each target;
    providing send target discovery sessions as default behavior;
    prohibiting send target discovery sessions as a system administrator option;
    configuring discovery via supporting protocols external to the iSCSI protocol;
    means for receiving an iSCSI login request;
    means for determining whether a payload of said iSCSI login request contains a "SessionType=Discovery" key/value pair; and
    when discovery sessions are disabled and said iSCSI login request contains said "SessionType=Discovery" key/value pair, means for rejecting said iSCSI login request.

6. The apparatus of claim 5, wherein said means for rejecting said iSCSI login request comprising means for rejecting said iSCSI login request with a iSCSI status-class of "Target Error" and status-detail of "Session Type not Supported."

7. The apparatus of claim 5, further comprising means for declaring a session type on said iSCSI login request.

8. The apparatus of claim 5, further comprising:
    when a session type is not explicitly declared on said iSCSI login request, means for assuming a session type is not a discovery session and means for specifying a specific target.

9. A computer-readable medium having computer-executable instructions for performing a method for managing discovery and ancillary protocols, said method comprising:
    maintaining iSCSI standard support for all discovery sessions on all network portals, including returning a list of all targets on the network entity and all of the portal groups associated with each target;
    providing send target discovery sessions as default behavior;
    prohibiting send target discovery sessions as a system administrator option;
    configuring discovery via supporting protocols external to the iSCSI protocol;
    receiving an iSCSI login request;
    determining whether a payload of said iSCSI login request contains a "SessionType=Discovery" key/value pair; and
    when discovery sessions are disabled and said iSCSI login request contains said "SessionType=Discovery" key/value pair, rejecting said iSCSI login request.

10. The computer-readable medium of claim 9, wherein said iSCSI login request is rejected with a iSCSI status-class of "Target Error" and status-detail of "Session Type not Supported."

11. The computer-readable medium of claim 9, wherein said method further comprising:
    declaring a session type on said iSCSI login request.

12. The computer-readable medium of claim 9, wherein said method further comprising:
    when a session type is not explicitly declared on said iSCSI login request, assuming a session type is not a discovery session and specifying a specific target.

13. A method for providing iSCSI target stealth operation, comprising:
- maintaining iSCSI standard support for all discovery sessions on all network portals, including returning a list of all targets on the network entity and all of the portal groups associated with each target;
- providing send target discovery sessions as default behavior;
- prohibiting send target discovery sessions as a system administrator option;
- configuring discovery via supporting protocols external to the iSCSI protocol;
- providing a setting to individually enable/disable at least one of discovery sessions, SLP, iSNS, ICMP, and SNMP; and
- when said discovery session, said SLP, and said iSNS are all disabled, providing a warning that an initiator must be statically configured to locate a target on an iSCSI entity.

14. The method of claim 13, wherein said enable/disable is distributed throughout a management application.

15. The method of claim 13, wherein said warning is provided to an administrator.

16. The method of claim 13, further comprising:
- when all discovery mechanisms are disabled, providing said warning to a user.

17. An apparatus for providing iSCSI target stealth operation, comprising:
- maintaining iSCSI standard support for all discovery sessions on all network portals, including returning a list of all targets on the network entity and all of the portal groups associated with each target;
- providing send target discovery sessions as default behavior;
- prohibiting send target discovery sessions as a system administrator option;
- configuring discovery via supporting protocols external to the iSCSI protocol;
- means for providing a setting to individually enable/disable at least one of discovery sessions, SLP, iSNS, ICMP, and SNMP; and
- when said discovery session, said SLP, and said iSNS are all disabled, means for providing a warning that an initiator must be statically configured to locate a target on an iSCSI entity.

18. The apparatus of claim 17, wherein said enable/disable is distributed throughout a management application.

19. The apparatus of claim 17, wherein said warning is provided to an administrator.

20. The apparatus of claim 17, further comprising:
- when all discovery mechanisms are disabled, means for providing said warning to a user.

21. A computer-readable medium having computer-executable instructions for performing a method for providing iSCSI target stealth operation, said method comprising:
- maintaining iSCSI standard support for all discovery sessions on all network portals, including returning a list of all targets on the network entity and all of the portal groups associated with each target;
- providing send target discovery sessions as default behavior;
- prohibiting send target discovery sessions as a system administrator option;
- configuring discovery via supporting protocols external to the iSCSI protocol;
- providing a setting to individually enable/disable at least one of discovery sessions, SLP, iSNS, ICMP, and SNMP; and
- when said discovery session, said SLP, and said iSNS are all disabled, providing a warning that an initiator must be statically configured to locate a target on an iSCSI entity.

22. The computer-readable medium of claim 21, wherein said enable/disable is distributed throughout a management application.

23. The computer-readable medium of claim 21, wherein said warning is provided to an administrator.

24. The computer-readable medium of claim 21, wherein said method further comprising:
- when all discovery mechanisms are disabled, providing said warning to a user.

* * * * *